(12) United States Patent
Barash

(10) Patent No.: US 8,677,103 B1
(45) Date of Patent: Mar. 18, 2014

(54) ASYNCHRONOUS PIPELINED DATA PATH WITH DATA TRANSITION

(75) Inventor: Dror Barash, Rannana (IL)

(73) Assignee: Marvell Isreal (M.I.S.L) Ltd., Yokneam (IL)

( * ) Notice: Subject to any disclaimer, the term of this patent is extended or adjusted under 35 U.S.C. 154(b) by 1657 days.

(21) Appl. No.: 10/970,116

(22) Filed: Oct. 20, 2004

(51) Int. Cl.
*G06F 7/38* (2006.01)
*G06F 9/00* (2006.01)
*G06F 9/44* (2006.01)
*G06F 15/00* (2006.01)

(52) U.S. Cl.
USPC .......................................................... 712/225

(58) Field of Classification Search
None
See application file for complete search history.

(56) References Cited

U.S. PATENT DOCUMENTS

| | | | |
|---|---|---|---|
| 5,838,933 A | 11/1998 | Molnar et al. | |
| 5,940,601 A | 8/1999 | Molnar et al. | |
| 6,157,955 A | 12/2000 | Narad et al. | |
| 6,584,147 B1 | 6/2003 | Schaumont | |
| 2003/0196078 A1 | 10/2003 | Wise et al. | |

OTHER PUBLICATIONS

Shen et al.; Modern Processor Design: Fundamentals of Superscalar Processors; Jul. 2002; McGraw-Hill; Beta Edition; pp. 173-179.*

* cited by examiner

*Primary Examiner* — Corey S Faherty

(57) ABSTRACT

Systems, methods, and computer program products for controlling a plurality of pipelined stages are described. In some implementations, an apparatus is described that includes a pipelined data path including a plurality of adjacent stages, where a stage includes a data store, a valid indicator, and a transfer controller including a state machine having a plurality of states. In some implementations, the stage is configured to send a status indicator different from the valid indicator to the state machine to indicate whether new data is available for processing by the stage in a next cycle, and whether a new data transfer is desired in the next cycle between the stage and the adjacent stage.

65 Claims, 10 Drawing Sheets

ASYNCHRONOUS PIPELINED DATA PATH WITH DATA TRANSITION

BACKGROUND

Pipelining is one technique used to make processors operate faster. Pipelining entails separating instruction and/or data paths into a number of stages. Pipelining enables data in different pipe stages to be operated on simultaneously.

A data path may be pipelined by adding a set of registers between each pair of pipe stages. Computational logic in the stage may operate on data in an adjacent register. Pipelining the data path may increase the speed at which results exit of the data path. Costs associated with pipelining include increased area for the registers and added latency corresponding to the number of clock cycles needed to initially fill (or prime) the pipeline, e.g., n clock stages in a pipeline with n stages. However, once the pipeline is filled, results may be issued nearly every clock cycle.

In certain pipelined data paths the number of cycles needed to process data in the stage may vary between stages, i.e., asynchronously. To prevent data from a stage from being written over valid data still being processed in the next stage, many processors including asynchronous pipelined data paths implement a handshake protocol between stages. In order for data to be moved up the pipe from one stage to the next stage, the two stages must agree that both are ready for the transfer. However, such handshake protocols require at least a clock cycle to complete, which introduces additional latency to the system.

SUMMARY

An asynchronous pipelined data path, e.g., in a switch, may include a state machine in each stage to control transfers of data into and out of that stage. The state machine may change states, and consequently initiate data transfers into and out of the stage, without sending or receiving requests or acknowledgments for the data transfer or any indication of the states of the state machines in other stages.

Each stage may include a data store to store data, a valid indicator to indicate whether the data in the data store in invalid or valid, and a transfer controller to control the transfer of data into and out of the data store. The transfer controller may include the state machine, which may control the stage to load data from a previous stage into the data store in response to one state transition and control the stage to transfer data out of the data store in response to another state transition. The pipelined data path may include control logic which may provide control signals to the stage. The stage may use the control signals to generate status signals for input to the state machine. The status signals may include the valid indicator and an indication whether a new calculation should start in the next cycle.

DETAILED DESCRIPTION

Figure 1A:
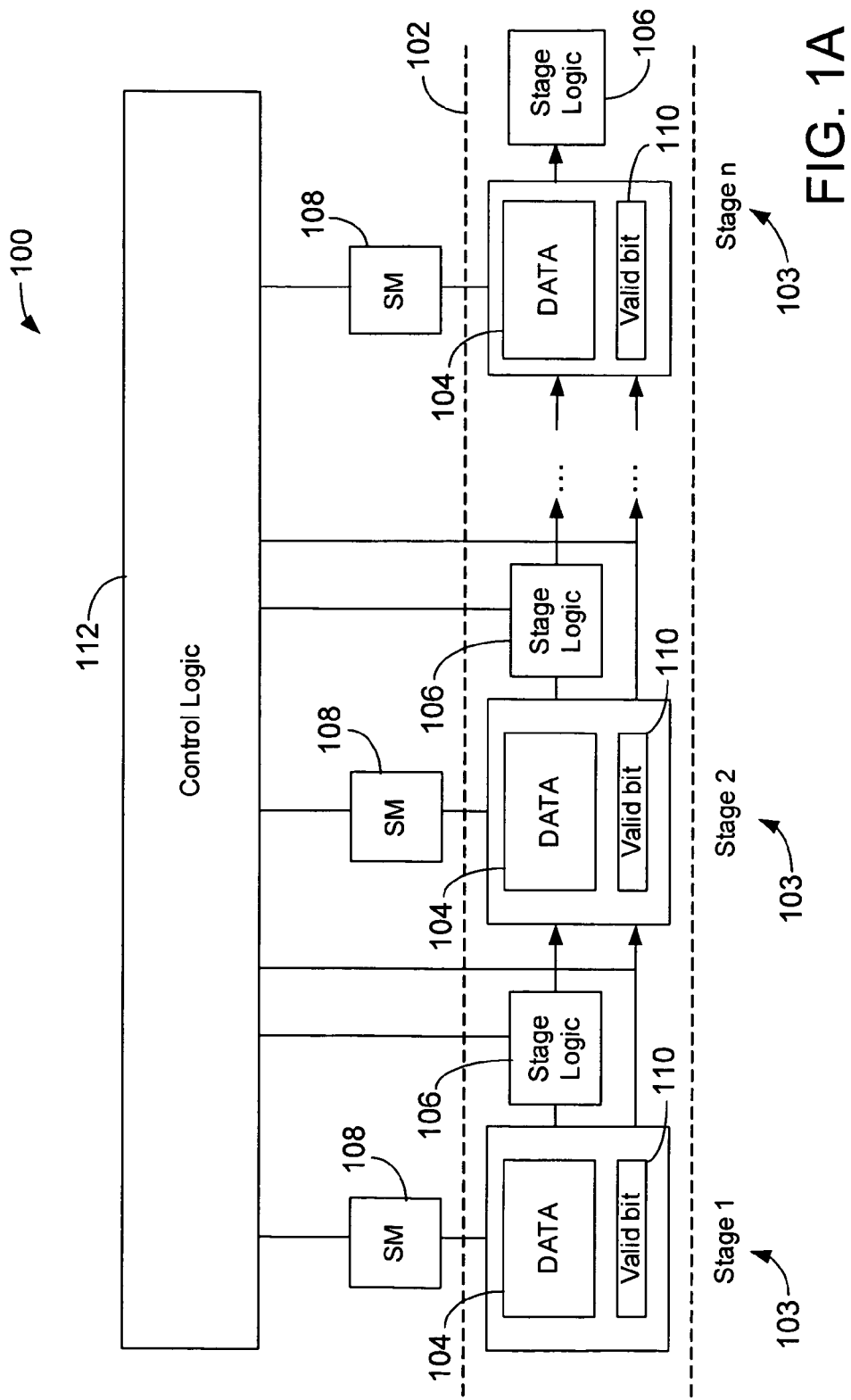
FIG. 1A is a block diagram of a pipelined data path according to an embodiment.
Figure 1B:
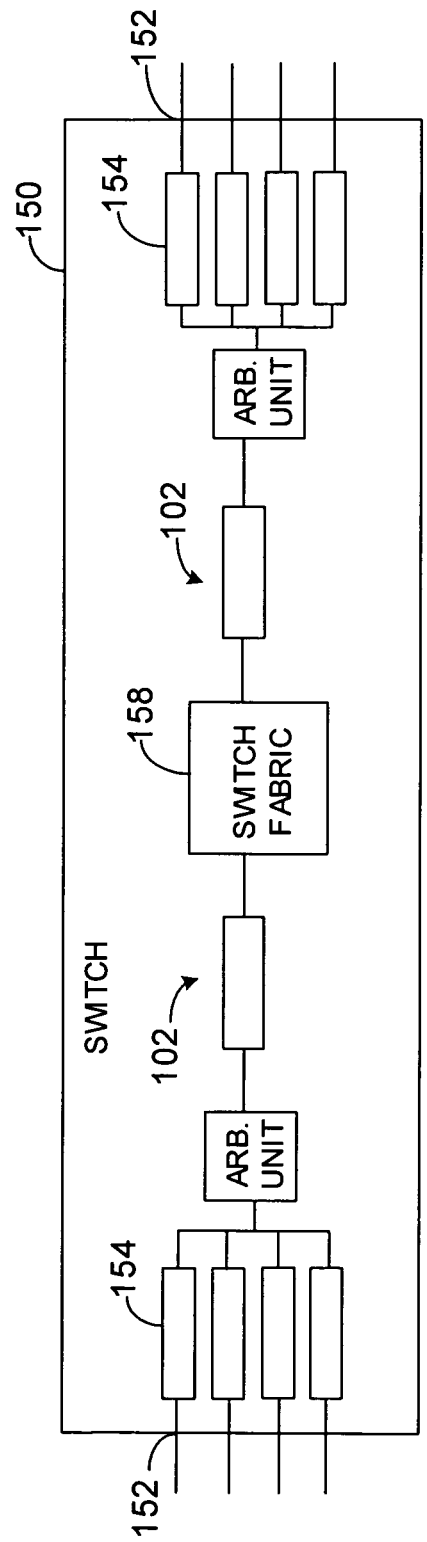
FIG. 1B is a block diagram of a switch including a pipelined data path.

FIG. 1A shows a pipelined data path 102 including n stages 103. Each stage includes a data store 104, e.g., a register. The data may be operated on by stage logic 106 before being transferred to the next stage. The pipelined data path may be used in, e.g., a switch 150, as shown in FIG. 1B. Packets received in ports 152 may be buffered in packet buffers 154 and then sent to the pipelined data path 102 by an arbitration unit 156. The packets may be subjected to different processing steps, e.g., policing, bridging, etc., in the different stages 103 before or after being switched by the switch fabric 158.

Data in a stage may be valid or invalid. Valid data is data that is properly in the stage, e.g., (1) the data is still being processed or (2) the data is finished being processed and has not yet been transferred to the next pipe stage. A stage may contain invalid data when valid data in that stage is transferred to the next stage and no new valid data is transferred into the stage.

The number of cycles needed to process data may vary between stages, i.e., asynchronously. To prevent data from a stage from being written over valid data still being processed in the next stage, many processors including asynchronous pipelined data paths implement a handshake protocol between stages. In order for data to be moved up the pipe from a stage to the next stage, the two stages must agree that both are ready for the transfer. Typically such handshake protocols require a stage ready to receive data to send a request to the previous stage and send an acknowledgment after receiving the data. However, such handshake protocols require at least a clock cycle to complete, which introduces additional latency to the system.

In an embodiment, each stage may include a state machine 108 that controls data transfers into and out of the stage. Each stage may also include a valid bit store 110, e.g., a flip flop. The valid bit store may be used to store a valid bit that indicates whether the data in the stage is valid or invalid. For example, valid data may be represented by a bit with a HIGH ("1") value, and invalid data may be represented by a bit with a LOW ("0") value.

Figure 2:
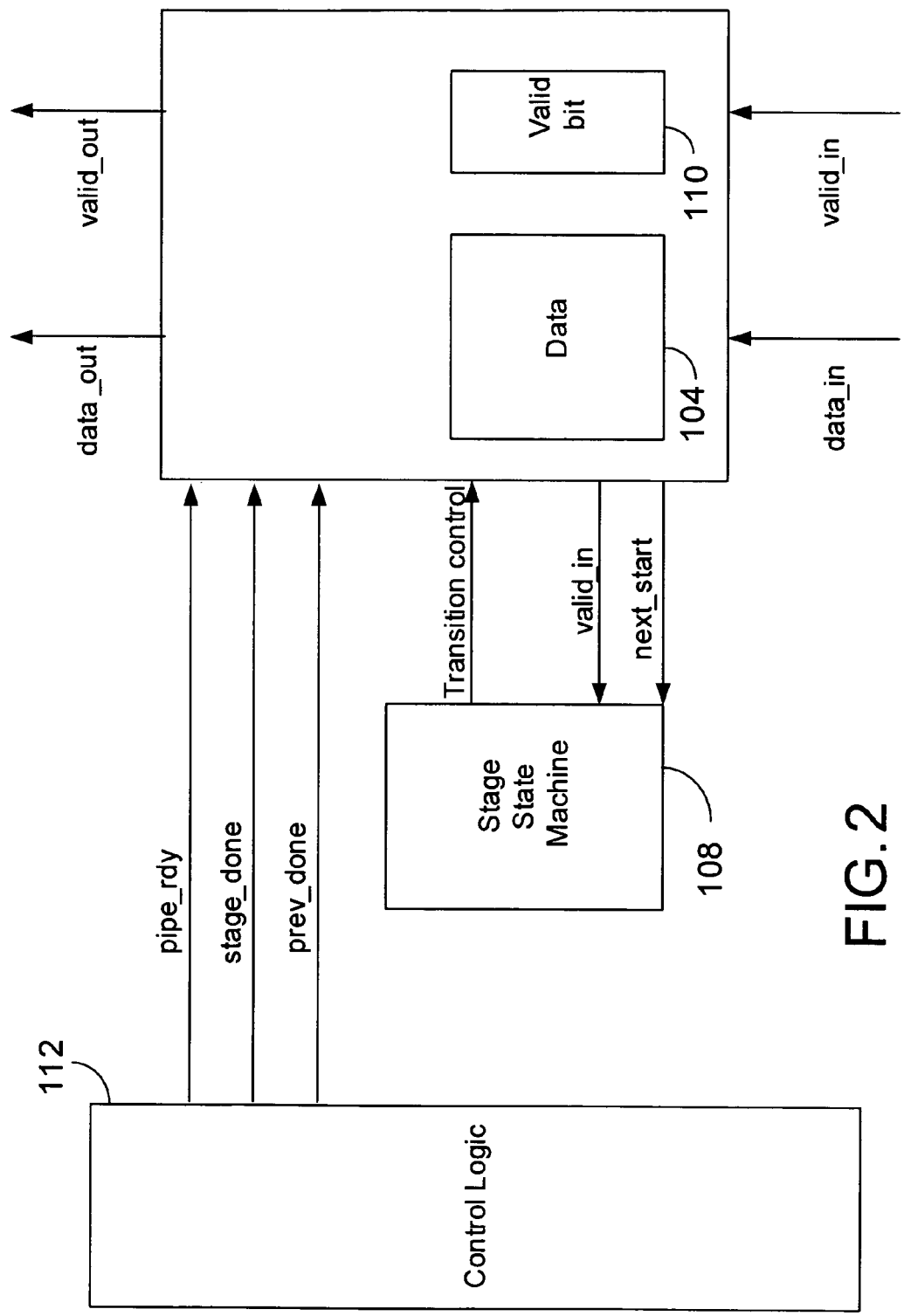
FIG. 2 is a block diagram of a pipe stage in the pipelined data path.

The state machine 108 can transition between states based on control signals from control logic 112 and signals from the stage itself, as shown in FIG. 2. Each stage can provide two types of information about itself: (1) whether the data in the stage is valid, indicated by the valid bit value; and (2) whether a new calculation should start in the next cycle, indicated by the "next_start" signal. The next_start signal is used so that the state machine does not have to communicate with other stages. Instead, the stage itself informs the state machine that in the next cycle there will be new data and a new process should begin.

The control logic 112 provides control signals to the state machine 108 in a stage based on control information provided by the stage logic 106 in the stage and other stages in the pipeline. The "stage_done" control signal indicates that the data in the stage has been completely processed or is in the last processing cycle. The "pipe_rdy" control signal indicates whether there is an invalid stage above this stage in the pipeline (also referred to as "downstream" in the pipeline) and whether all stages between the current stage and the invalid stage are valid and finished processing. The "prev_done" control signal indicates whether the previous stage is done processing. The "valid_in" control signal indicates whether the previous stage contains valid data.

Figure 3:
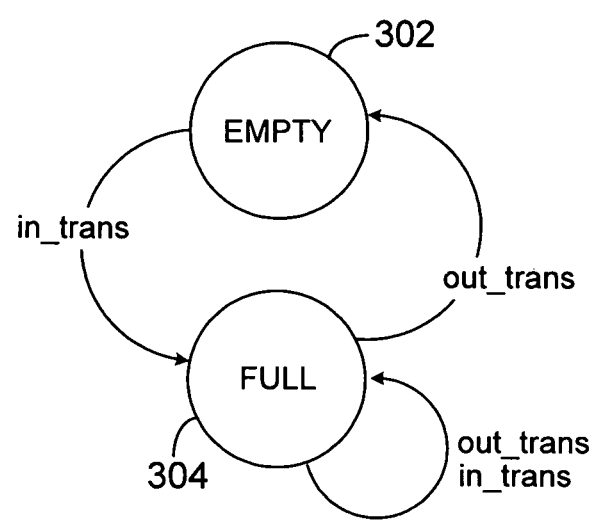
FIG. 3 is a state transition diagram for a state machine in a pipe stage.

FIG. 3 is a state transition diagram 300 for the state machine 108. The state machine may have two states: an "EMPTY" state 302 and a "FULL" state 304. In the EMPTY state 302, the stage is empty or contains invalid data. In the FULL state 304, the stage contains valid data. The state machine may transition between these states in response to two state transitions: an outgoing transfer ("out_trans") state transition and an incoming transfer ("in_trans") state transition. The state machine controls the stage to output the data to the next stage in response to an out_trans state transition. The state machine controls the stage to load data from the previous stage into the data store 104, overwriting the current data in the data store, in response to an in_trans state transition. The state machine may have an in_trans and an out_trans in the same cycle, e.g., when the pipe is moving and data is loaded into and output from the stage in the same cycle.

In an embodiment, the state machines of different pipe stages do not communicate with each other. Rather than have a handshake protocol established between stages to determine if it is safe to transfer data into a next stage, it is assumed from the control signals whether it is time to transfer data. Accordingly, there are no requests for acknowledgments for data transfers transmitted between stages in the pipeline. For example, it is assumed that if the state machine in one stage has an out_trans, the state machine in the next will have an in_trans in the same cycle. There is no need to check if the next or previous stage is in the right state or state transition for a transfer of data into or out of the stage as this is indicated by the control signals. In this manner, the latency usually associated with such handshake protocols may be reduced or eliminated.

Figure 4:
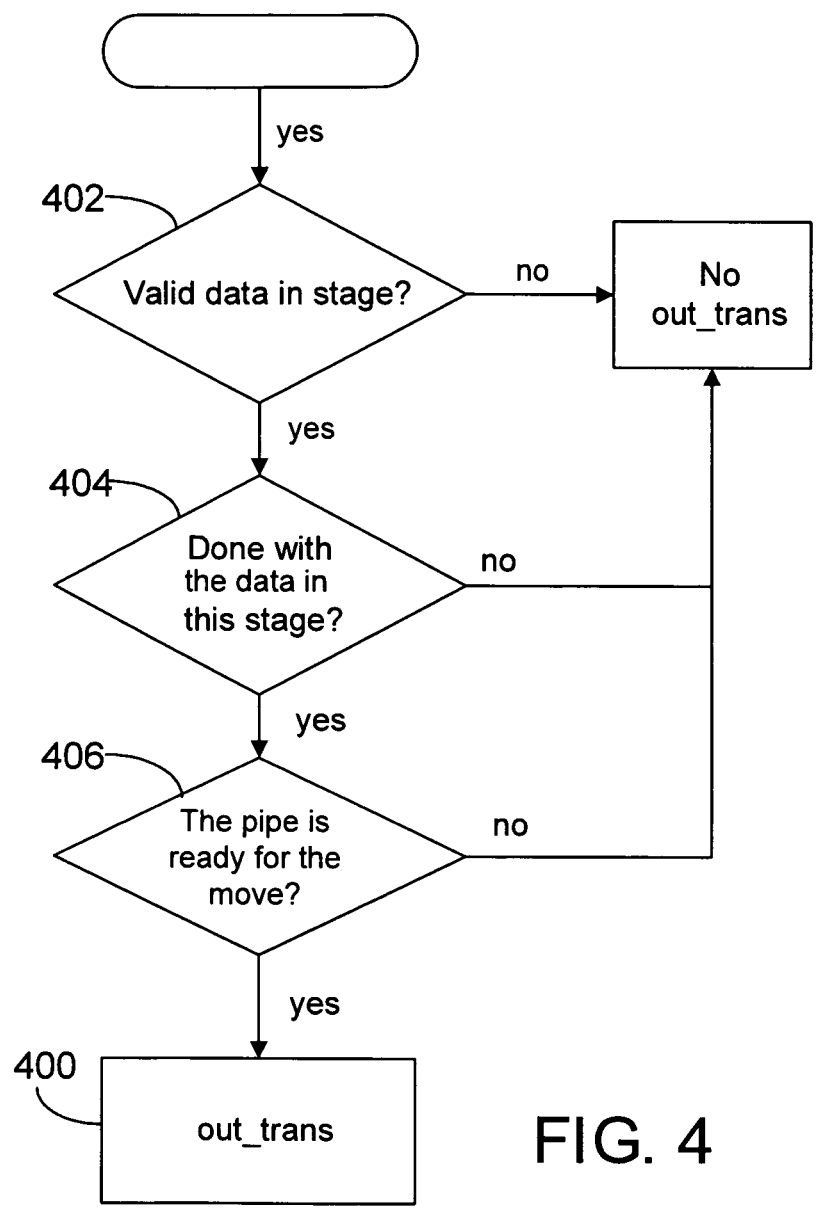
FIG. 4 is a flowchart describing a data transfer out of a pipe stage.

FIG. 4 is a flowchart describing the triggering of an out_trans state transition 400 and consequent transfer of data out of the stage and into the next stage. The state machine will have an out_trans state transition if the following three conditions are met: (1) there is valid data in the stage 402 (indicated by the valid bit value); (2) this stage is done processing the data 404 (indicated by the stage_done control signal); and (3) the pipe is ready for the move 406 (indicated by the pipe_rdy control signal).

Figure 5:
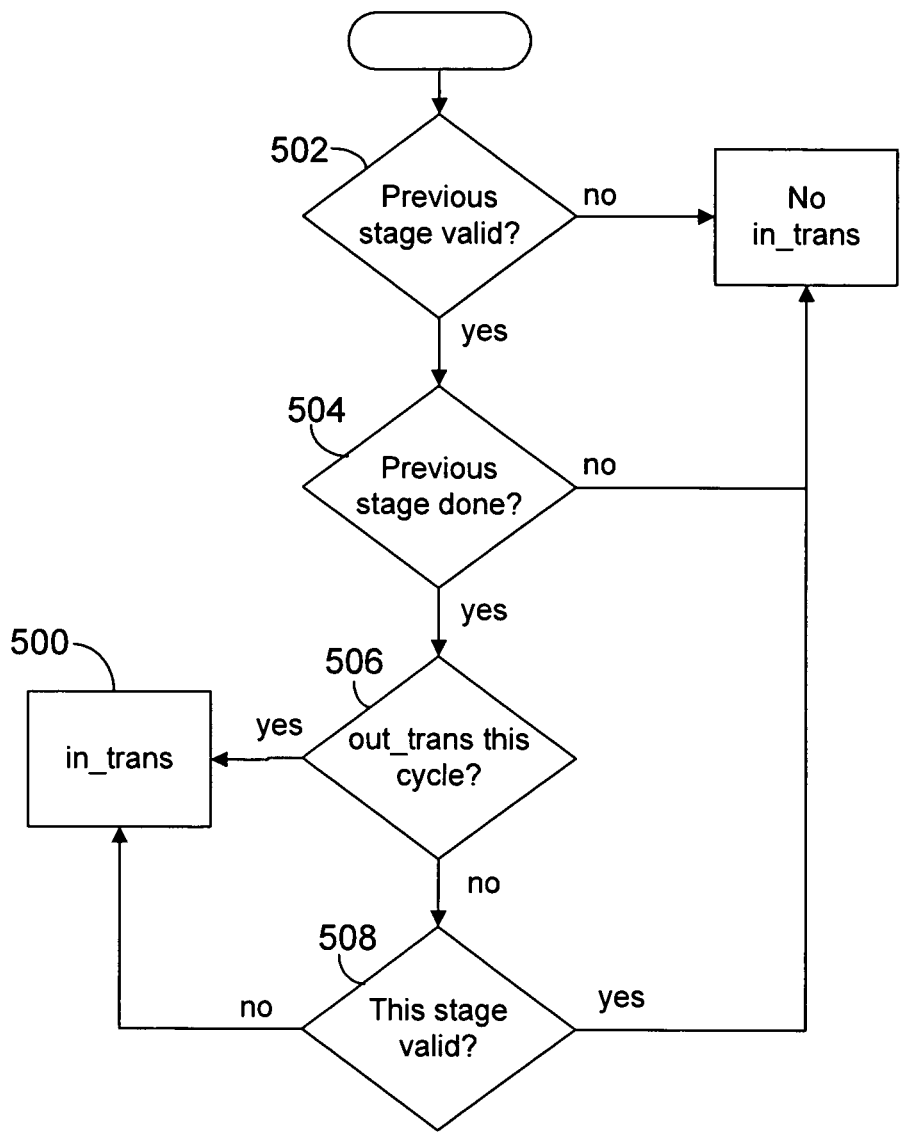
FIG. 5 is a flowchart describing a data transfer into a pipe stage.

FIG. 5 is a flowchart describing the triggering of an in_trans state transition 500 of the state machine and consequent loading of data from the previous stage into the current stage. The state machine will transition to an in_trans state if the previous stage has valid data 502 (indicated by the valid_in signal), the previous stage is finished processing the data 504 (indicated by the prev_done control signal), and one of the following two conditions are met: (1) there is an out_trans in this stage this cycle 506; or (2) the data in this stage is invalid 508 (indicated by the valid bit value).

Figure 6:
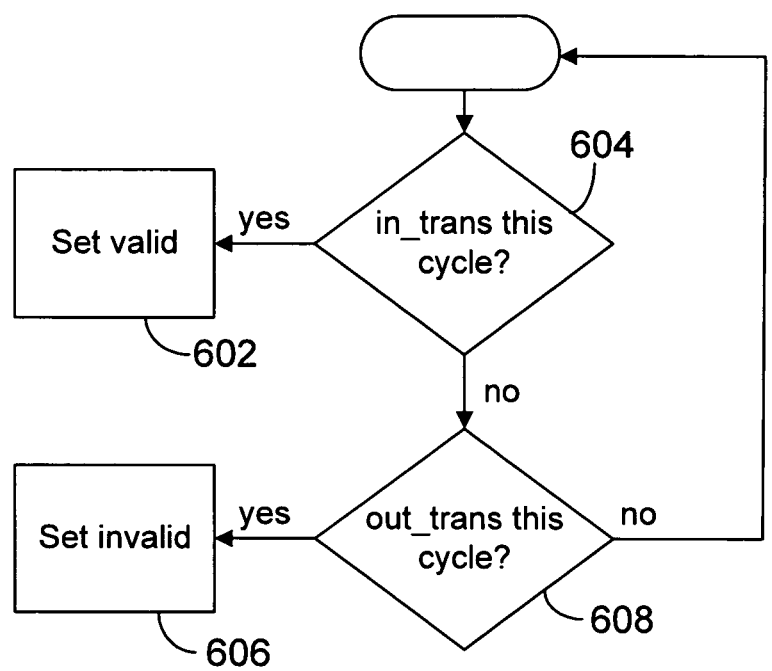
FIG. 6 is a flowchart describing a valid bit value transition in a pipe stage.

The valid bit store 110 holds the valid bit, which may change in response to different events. FIG. 6 is a flowchart describing transitions of the valid bit value. The valid bit is asserted 602 (indicating valid data) if there is an in_trans in the cycle, since it is assumed that only valid data is loaded into the stage. The valid bit is de-asserted 606 (indicating invalid data) when there is an out_trans and no in_trans 608. This is because the stage is done with this data and it has been passed down the pipe, and therefore is no longer valid for this stage. The value of the valid bit is unchanged if there is no in_trans or out_trans in a cycle.

Figure 7:
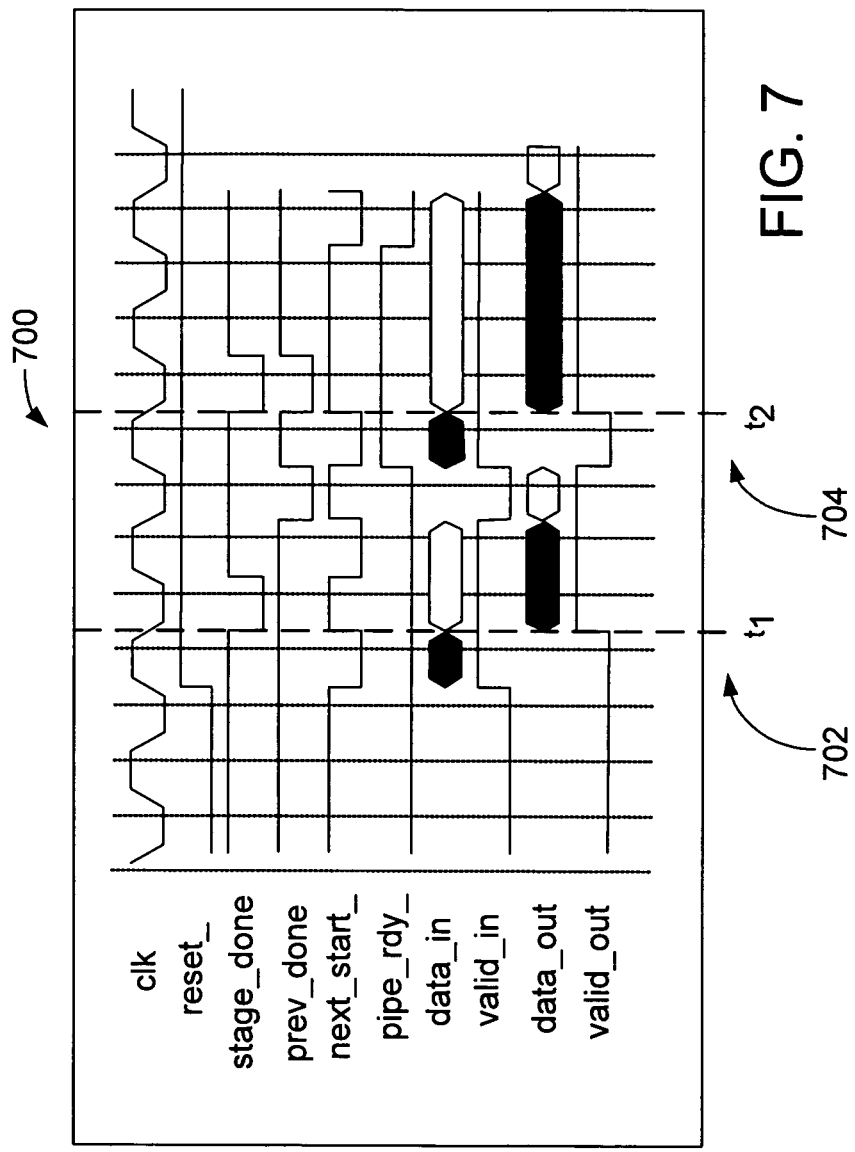
FIG. 7 is a timing diagram illustrating data transfers in a pipe stage.

FIG. 7 is a timing diagram 700 illustrating the timing sequence for an incoming transfer and an outgoing transfer. An incoming transfer occurs at time $t_1$ 702 because the valid_in, prev_done, and next_start control signals are asserted, indicating that the data coming in is valid, the previous stage is done processing the data, and the stage is ready to start a new calculation. An outgoing transfer occurs at time $t_2$ 704 because the valid_out and pipe_rdy control signals are asserted, indicating that the data in the stage is valid, the data in the next stage is invalid, and all stages up to this stage are done.

Figure 8:
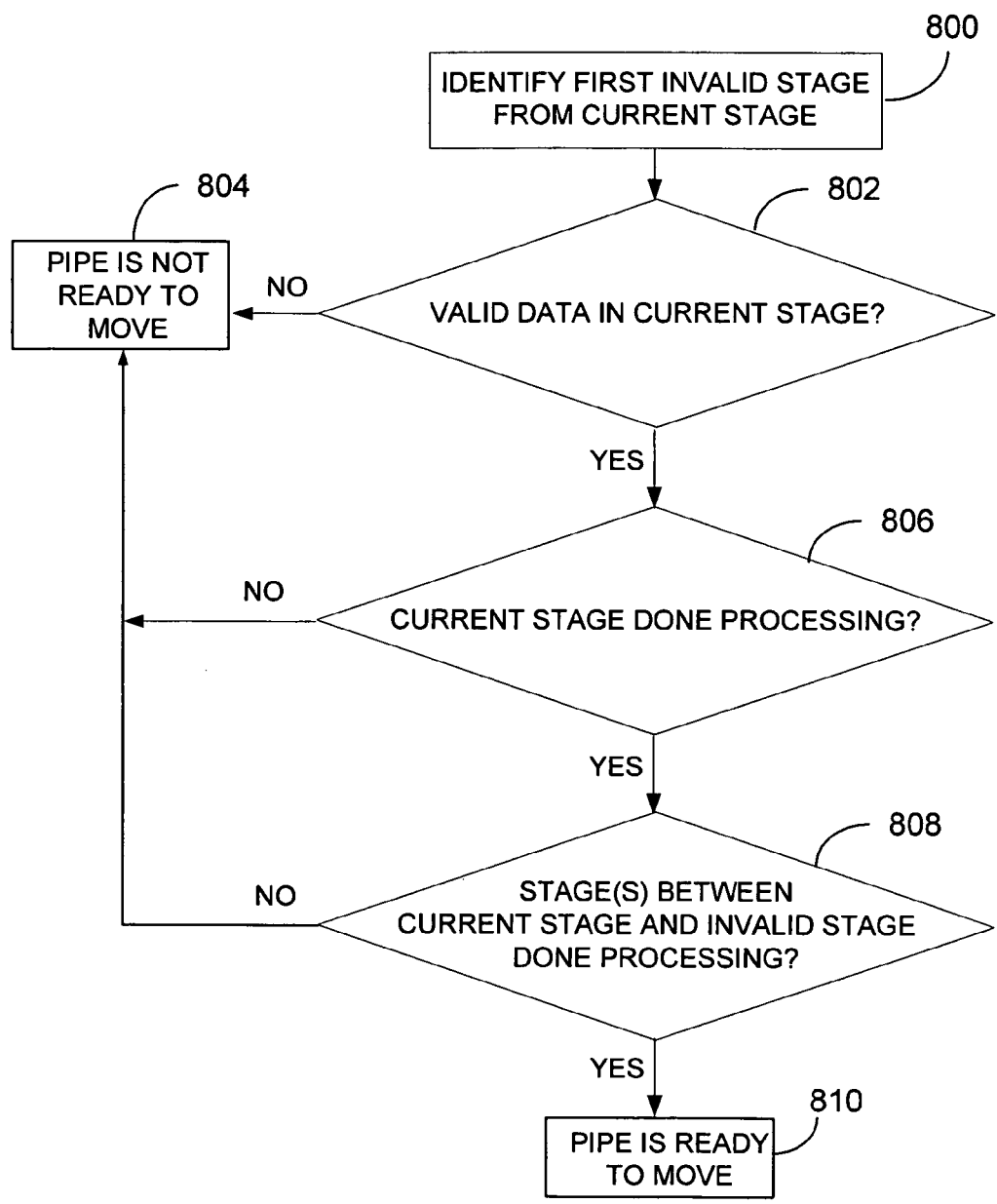
FIG. 8 is a flowchart describing how data moves in the pipeline.

FIG. 8 is a flowchart describing how data moves in the pipeline. When control logic identifies an invalid stage down stream in the pipeline from the current stage (i.e., the first invalid stage from the current stage) (block 800), the control logic determines if the data in the current stage is current (block 802). If not, the pipe is not ready to move (block 804). Control logic also determines if the current stage is finished processing (block 806). In addition, control logic determines whether the stage(s) between the current stage and the invalid stage are done processing (block 808). If these conditions are not met, the pipe is not ready to move (block 804). However, if all of these conditions are met, the pipe is ready to move (block 810).

Figure 9A:
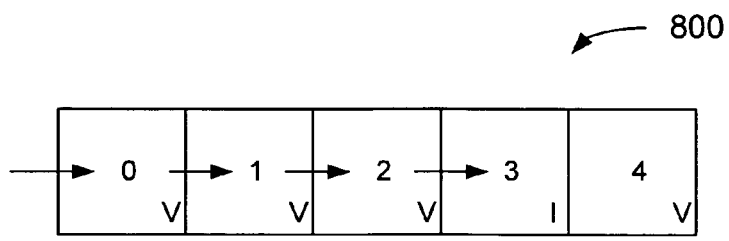
FIGS. 9A and 9B illustrate an exemplary data transfer in the pipelined data path.
Figure 9B:
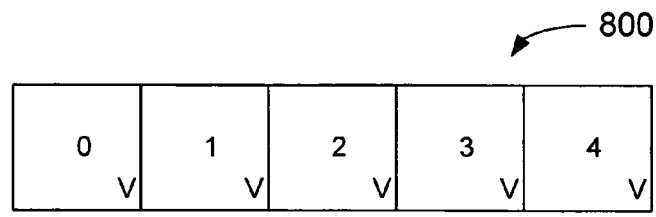

FIGS. 9A and 9B illustrate an example of how data moves down the pipe. For example, as shown in FIG. 9A, stages 0, 1, and 2 in a five-stage pipe 900 contain valid data ("V") and are done processing. The data in stage 4 is also valid, but the stage is still processing the data. The data in stage 3 is invalid ("I"). As shown by the arrows in FIG. 9A, the valid data in stages 0, 1, and 2 can move forward for processing in stages 1, 2, and 3, respectively, and new data can be loaded into stage 0. The valid data in stage 4 does not have to be moved and may continue to be processed. As shown in FIG. 9B, in the next cycle all five stages contain valid data.

Figure 10A:
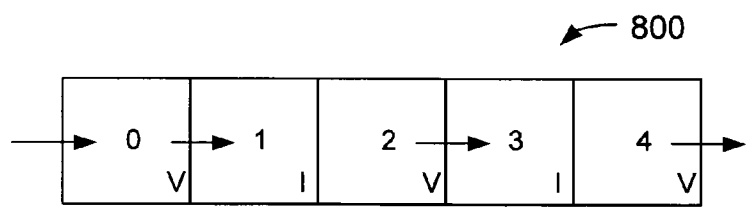
FIGS. 10A and 10B illustrate another exemplary data transfer in the pipelined data path.
Figure 10B:
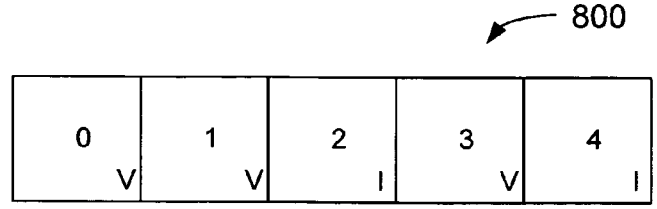

FIGS. 10A and 10B illustrate another example of how data moves down the pipe. For example, as shown in FIG. 10A, stages 0, 2, and 4 in the five-stage pipe 800 contain valid data and are done processing. The data in stages 1 and 3 is invalid. As shown by the arrows in FIG. 10A, the valid data in stages 0 and 2 can move forward for processing in stages 1 and 3, respectively, and new data can be loaded into stage 0. The valid data in stage 4 can exit the data path. FIG. 10B shows the status of the pipe stages in the next cycle. In this case, both stage 2 and stage 4 now contain invalid data because they experienced an outgoing transition without an incoming transition to replace the valid data that was transferred out of the respective stage.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

What is claimed is:

1. An apparatus comprising:
   an asynchronous pipelined data path including:
      a plurality of adjacent stages having a stage that includes:
         a data store to store data,
         a valid indicator to indicate whether the data in the data store is valid or invalid, and a transfer controller to control the transfer of data into and out of the data store without sending or receiving an acknowledgement for the data transfer to or from an adjacent stage, respectively, after the transfer of the data and before processing of the data is complete, the transfer controller including a state machine having a plurality of states and operative to:
  control the stage to load data from a previous stage into the data store in response to a first state transition indicating data in the previous stage has been processed and a signal indicating the data in the previous stage is valid, and
  control the stage to transfer data in the data store to the next stage in response to a second state transition indicating data in the stage and data in the next stage have been processed and a signal indicating that data in a stage downstream from the next stage is invalid and data in all stages between the stage and the downstream stage are valid, wherein the signal indicates that the data in all stages between the stage and the downstream stage are valid when the data in all stages between the stage and the downstream stage have been processed and have not been transferred to a next stage; and
control logic to:
  receive status signals from each of the plurality of stages, wherein the status signals for each of the stages include a valid indicator and a signal indicating whether data in the respective stage has been processed,
  identify, based on the received status signals, the stage downstream from the next stage that is invalid,
  determine, based on the received status signals, that the data in all the stages between the stage and the downstream stage are valid, and
  send control signals to the transfer controller, wherein the control signals include the signal indicating that the data in the stage downstream from the next stage is invalid and the data in all the stages between the stage and the downstream stage are valid,
wherein the stage is configured to send a status indicator different from the valid indicator to the state machine to indicate whether new data will be processed by the stage in a next cycle, and whether data will be transferred in the next cycle between the stage and the adjacent stage.

2. The apparatus of claim 1, wherein the state machine is operative to transition between states in response to the control signals from the control logic and the status signals from the stage.

3. The apparatus of claim 1, wherein the state machine is operative to perform the first state transition in a clock cycle in response to the state machine performing the second state transition in the clock cycle.

4. The apparatus of claim 1, wherein the asynchronous pipelined data path has an entrance adjacent a first stage and an exit adjacent a last stage, and
  wherein the state machine is operative to perform the second state transition in response to the valid indicator indicating that the data in the data store is invalid and receiving:
    a control signal indicating that the last stage or any stage between the stage and the last stage contains invalid data; and
    a control signal indicating that the stage or any stage between the first stage and the stage is done processing.

5. An apparatus comprising:
  an asynchronous pipelined data path including a plurality of adjacent stages having a stage that includes:
  a data store to store data;
  a valid indicator to indicate whether the data in the data store is valid or invalid, where the valid indicator indicates the data in the data store is valid when the data in the data store is currently being processed or when the data has been processed by the data store but not yet transferred to a next stage, and indicates the data in the data store is invalid when the data in the data store has been transferred to the next stage but no new data has been received by the stage from a previous stage; and
  a transfer controller to control the transfer of data into and out of the data store based on the valid indicator without sending or receiving an acknowledgement for the data transfer to the previous stage or from the next stage, respectively, after the transfer of the data and before processing of the data is complete, the transfer controller to control the transfer of data out of the data store in response to a signal indicating that data in a stage downstream from the next stage is invalid and data in all stages between the stage and the downstream stage are valid, wherein the signal indicates that the data in all stages between the stage and the downstream stage are valid when the data in all stages between the stage and the downstream stage have been processed and have not been transferred to a next stage, and
  wherein the stage is configured to send a status indicator different from the valid indicator to a state machine to indicate whether new data will be processed by the stage in a next cycle, and whether data will be transferred in the next cycle between the stage and the next stage or the previous stage.

6. The apparatus of claim 5, wherein the stage is adjacent to the next stage and the previous stage in the asynchronous pipelined data path.

7. The apparatus of claim 6, wherein the transfer controller comprises the state machine having a plurality of states and operative to:
  control the stage to load data from the previous stage into the data store in response to a first state transition; and
  control the stage to transfer data in the data store to the next stage in response to a second state transition.

8. The apparatus of claim 7, wherein the state machine associated with the stage is operative to transition between states without an indication of a state transition of a state machine associated with the previous stage or the next stage.

9. The apparatus of claim 7, further comprising:
  control logic to:
    receive status signals from each of the plurality of stages, wherein the status signals for each stage include a valid indicator and a signal indicating whether data in the respective stage has been processed,
    identify, based on the received status signals, the stage downstream from the next stage that is invalid,
    determine, based on the received status signals, that the data in all the stages between the stage and the downstream stage are valid, and
    send control signals to the transfer controller, wherein the control signals include the signal indicating that the data in the stage downstream from the next stage is invalid and the data in all the stages between the stage and the downstream stage are valid.

10. The apparatus of claim 9, wherein the state machine is operative to transition between states in response to control signals from the control logic and status signals from the stage.

11. The apparatus of claim 9, wherein the state machine is operative to perform the first state transition in response to the valid indicator indicating that the data in the data store is invalid and receiving:
   a control signal indicating that the previous stage is finished processing data; and
   a signal indicating that the data in the previous stage is valid.

12. The apparatus of claim 9, wherein the state machine is operative to perform the first state transition in a clock cycle in response to the state machine performing the second state transition in the clock cycle and receiving:
   a control signal indicating that the previous stage is finished processing data; and
   a signal indicating that the data in the previous stage is valid.

13. The apparatus of claim 9, wherein the asynchronous pipelined data path has an entrance adjacent a first stage and an exit adjacent a last stage.

14. The apparatus of claim 13, wherein the state machine is operative to perform the second state transition in response to the valid indicator indicating that the data in the data store is invalid and receiving:
   a control signal indicating that the last stage or any stage between the stage and the last stage contains invalid data; and
   a control signal indicating that the stage or any stage between the first stage and the stage is done processing.

15. The apparatus of claim 5, wherein the stage is operative to set a value of the valid indicator to indicate valid data in response to loading data into the data store in a clock cycle.

16. The apparatus of claim 5, wherein the stage is operative to set a value of the valid indicator to indicate invalid data in response to outputting data from the data store and not loading data into the data store in a clock cycle.

17. A method comprising:
   in a stage in an asynchronous pipelined data path including a plurality of adjacent stages, transferring data into and out of the stage without sending or receiving an acknowledgement for the data transfer to or from an adjacent stage, respectively, after the transferring of the data and before processing of the data is complete including:
   controlling the stage to load data from a previous stage in the asynchronous pipelined data path in response to a state machine associated with the stage performing a first state transition indicating data in a previous stage has been processed and a signal indicating the data in the previous stage is valid;
   controlling the stage to transfer data to a next stage in the pipeline in response to the state machine associated with the stage performing a second state transition indicating data in the stage and data in the next stage have been processed and a signal indicating that data in a stage downstream from the next stage is invalid and data in all stages between the stage and the downstream stage are valid, wherein the signal indicates that the data in all stages between the stage and the downstream stage are valid when the data in all stages between the stage and the downstream stage have been processed and have not been transferred to a next stage; and
   sending a status indicator to the state machine to indicate whether new data will be processed by the stage in a next cycle, and whether data will be transferred in the next cycle between the stage and the adjacent stage.

18. The method of claim 17, further comprising changing a state of the state machine associated with the stage without an indication of a state transition of a state machine associated with the previous stage or the next stage.

19. The method of claim 17, further comprising transitioning between the states of the state machine in response to control signals from control logic and status signals from the stage, the control signals including the signal indicating that data in the stage downstream from the next stage is invalid and the data in all the stages between the stage and the downstream stage are valid.

20. The method of claim 17, further comprising performing the first state transition in response to receiving:
   a signal indicating that data in the stage is invalid.

21. The method of claim 17, further comprising performing the first state transition in a clock cycle in response to the state machine performing the second state transition in the clock cycle.

22. The method of claim 17, further comprising performing the second state transition in response to receiving:
   a control signal indicating that a last stage in the pipeline or any stage between the stage and the last stage contains invalid data;
   a control signal indicating that the stage or any stage between a first stage and the stage is done processing; and
   a signal indicating that the data in the stage is invalid.

23. The method of claim 17, further comprising setting a value of a valid indicator associated with the stage to indicate valid data in response to loading data into the stage in a clock cycle.

24. The method of claim 17, further comprising setting the value of the valid indicator to indicate invalid data in response to outputting data from the stage and not loading data into the stage in a clock cycle.

25. An apparatus comprising:
   means for providing a plurality of adjacent asynchronous stages having a stage that includes:
   means for storing data;
   means for indicating whether the data in the means for storing data is valid or invalid; and
   means for controlling the transfer of data into and out of the means for storing data without sending or receiving an acknowledgement for the data transfer to or from an adjacent stage, respectively, after the transfer of the data and before processing of the data is complete, the means for controlling including means for transitioning operative to:
   control the stage to load data from a previous stage into the means for storing in response to a first state transition indicating data in the previous stage has been processed and a signal indicating the data in the previous stage is valid; and
   control the stage to transfer data in the means for storing data to the next stage in response to a second state transition indicating data in the stage and data in the next stage have been processed and a signal indicating that data in a stage downstream from the next stage is invalid and data in all stages between the stage and the downstream stage are valid, wherein the signal indicates that the data in all stages between the stage and the downstream stage are valid when the data in all stages between the stage and the downstream stage have been processed and have not been transferred to a next stage, wherein the stage is configured to send a status indicator different from the means for indicating to the means for transitioning to indicate whether new data will be processed by the stage in a next cycle, and whether data will be transferred in the next cycle between the stage and the adjacent stage.

26. The apparatus of claim 25, wherein the stage is adjacent to the next stage and the previous stage in the means for providing the plurality of adjacent asynchronous stages.

27. The apparatus of claim 26, wherein the means for transitioning associated with the stage is operative to transition between states without an indication of a state transition of another means for transitioning associated with the previous stage or the next stage.

28. The apparatus of claim 26, further comprising:
means for receiving status signals from each of the plurality of adjacent asynchronous stages; and
means for sending control signals to the means for controlling the transfer of data.

29. The apparatus of claim 28, wherein the means for transitioning is operative to transition between states in response to the control signals and the status signals from the stage.

30. The apparatus of claim 28, wherein the means for transitioning is operative to perform the first state transition in response to an indication by the means for indicating that the data in the means for storing data is invalid and receiving:
a control signal indicating that the previous stage is finished processing data; and
a signal indicating that the data in the previous stage is valid.

31. The apparatus of claim 28, wherein the means for transitioning is operative to perform the first state transition in a clock cycle in response to the means for transitioning performing the second state transition in the clock cycle.

32. The apparatus of claim 28, wherein the means for providing the plurality of adjacent asynchronous stages has an entrance adjacent a first stage and an exit adjacent a last stage.

33. The apparatus of claim 32, wherein the means for transitioning is operative to perform the second state transition in response to the means for indicating that the data in the means for storing data is invalid and receiving:
a control signal indicating that the last stage or any stage between the stage and the last stage contains invalid data; and
a control signal indicating that the stage or any stage between the first stage and the stage is done processing.

34. The apparatus of claim 25, further comprising:
means for setting a value of the valid indicator to indicate valid data in response to loading data into the means for storing data in a clock cycle.

35. The apparatus of claim 25, further comprising:
means for setting a value of the means for indicating to indicate invalid data in response to outputting data from the means for storing data and not loading data into the means for storing data in a clock cycle.

36. A computer-implemented method comprising:
in a stage in an asynchronous pipelined data path including a plurality of adjacent stages, transferring data into and out of the stage without sending or receiving an acknowledgement for the data transfer to or from an adjacent stage, respectively, after the transferring of the data and before processing of the data is complete including:
controlling the stage to load data from a previous stage in the pipeline in response to a state machine associated with the stage performing a first state transition indicating data in a previous stage has been processed and a signal indicating the data in the previous stage is valid;
controlling the stage to transfer data to a next stage in the pipeline in response to the state machine associated with the stage performing a second state transition indicating data in the stage and data in the next stage have been processed and a signal indicating that data in a stage downstream from the next stage is invalid and data in all stages between the stage and the downstream stage are valid, wherein the signal indicates that the data in all stages between the stage and the downstream stage are valid when the data in all stages between the stage and the downstream stage have been processed and have not been transferred to a next stage; and
sending a status indicator to the state machine to indicate whether new data will be processed by the stage in a next cycle, and whether data will be transferred in the next cycle between the stage and the adjacent stage.

37. The computer-implemented method of claim 36, further comprising changing the state of the state machine associated with the stage without an indication of a state transition of a state machine associated with the previous stage or the next stage.

38. The computer-implemented method of claim 36, further comprising transitioning between the states of the state machine in response to control signals from control logic and status signals from the stage, wherein the control signals include the signal indicating that the data in the stage downstream from the next stage is invalid and the data in all the stages between the stage and the downstream stage are valid.

39. The computer-implemented method of claim 36, further comprising performing the first state transition in response to receiving:
a signal indicating that data in the stage is invalid.

40. The computer-implemented method of claim 36, further comprising performing the first state transition in a clock cycle in response to the state machine performing the second state transition in the clock cycle.

41. The computer-implemented method of claim 36, further comprising performing the second state transition in response to receiving:
a control signal indicating that a last stage in the asynchronous pipelined data path or any stage between the stage and the last stage contains invalid data;
a control signal indicating that the stage or any stage between a first stage and the stage is done processing; and
a signal indicating that the data in the stage is invalid.

42. The computer-implemented method of claim 36, further comprising setting a value of a valid indicator associated with the stage and different from the status indicator to indicate valid data in response to loading data into the stage in a clock cycle.

43. The computer-implemented method of claim 36, further comprising setting the value of the valid indicator different from the status indicator to indicate invalid data in response to outputting data from the stage and not loading data into the stage in a clock cycle.

44. A system comprising:
a plurality of ports for receiving data packets;
a switch fabric to switch the data packets;
a pipelined data path between the plurality of ports and the switch fabric and including;

a plurality of adjacent stages having a stage that includes:
  a data store to store data in a data packet,
  a valid indicator to indicate whether the data in the data store is valid or invalid, and
  a transfer controller to control the transfer of data into and out of the data store without sending or receiving an acknowledgement for the data transfer to or from an adjacent stage, respectively, after the transfer of the data and before processing of the data is complete, the transfer controller including a state machine having a plurality of states and operative to:
    control the stage to load data from a previous stage into the data store in response to a first state transition indicating data in the previous stage has been processed and a signal indicating the data in the previous stage is valid, and
    control the stage to transfer data in the data store to the next stage in response to a second state transition indicating data in the stage and data in the next stage have been processed and a signal indicating that data in a stage downstream from the next stage is invalid and data in all stages between the stage and the downstream stage are valid, wherein the signal indicates that the data in all stages between the stage and the downstream stage are valid when the data in all stages between the stage and the downstream stage have been processed and have not been transferred to a next stage; and
control logic to:
  receive status signals from each of the plurality of stages, wherein the status signals for each of the stages include a valid indicator and a signal indicating whether data in the respective stage has been processed,
  identify, based on the received status signals, the stage downstream from the next stage that is invalid,
  determine, based on the received status signals, that the data in all the stages between the stage and the downstream stage are valid, and
  send control signals to the transfer controller, wherein the control signals include the signal indicating that the data in the stage downstream from the next stage is invalid and the data in all the stages between the stage and the downstream stage are valid,
wherein the stage is configured to send a status indicator different from the valid indicator to the state machine to indicate whether new data will be processed by the stage in a next cycle, and whether data will be transferred in the next cycle between the stage and the adjacent stage.

45. The system of claim 44, wherein one of the plurality of stages is adjacent to the next stage and the previous stage in the pipelined data path.

46. The system of claim 45, wherein the state machine associated with the stage is operative to transition between states without an indication of a state transition of a state machine associated with the previous stage or the next stage.

47. The system of claim 44, wherein the state machine is operative to transition between states in response to control signals from the control logic and status signals from the stage.

48. The system of claim 44, wherein the state machine is operative to perform the first state transition in response to the valid indicator indicating that the data in the data store is invalid.

49. The system of claim 44, wherein the state machine is operative to perform the first state transition in a clock cycle in response to the state machine performing the second state transition in the clock cycle.

50. The system of claim 44, wherein the pipelined data path has an entrance adjacent a first stage and an exit adjacent a last stage.

51. The system of claim 50, wherein the state machine is operative to perform the second state transition in response to the valid indicator indicating that the data in the data store is invalid and receiving:
  a control signal indicating that the last stage or any stage between the stage and the last stage contains invalid data; and
  a control signal indicating that the stage or any stage between the first stage and the stage is done processing.

52. The system of claim 44, wherein the stage is operative to set a value of the valid indicator to indicate valid data in response to loading data into the data store in a clock cycle.

53. The system of claim 44, wherein the stage is operative to set a value of the valid indicator to indicate invalid data in response to outputting data from the data store and not loading data into the data store in a clock cycle.

54. A system comprising:
  means for receiving data packets;
  means for switching the data packets; and
  asynchronous pipelined data path means for providing a plurality of adjacent stages, the pipelined data path means between the means for receiving and the means for switching, wherein the plurality of adjacent stages includes a stage that includes:
  means for storing data in a data packet;
  means for indicating whether the data in the means for storing data is valid or invalid;
  means for controlling the transfer of data into and out of the means for storing data without sending or receiving an acknowledgement for the data transfer to or from an adjacent stage, respectively, after the transfer of the data and before processing of the data is complete, the means for controlling including means for transitioning operative to:
  control the stage to load data from a previous stage into the means for storing in response to a first state transition indicating data in the previous stage has been processed and a signal indicating the data in the previous stage is valid; and
  control the stage to transfer data in the means for storing data to the next stage in response to a second state transition indicating data in the stage and data in the next stage have been processed and a signal indicating that data in a stage downstream from the next stage is invalid and data in all stages between the stage and the downstream stage are valid, wherein the signal indicates that the data in all stages between the stage and the downstream stage are valid when the data in all stages between the stage and the downstream stage have been processed and have not been transferred to a next stage, and
  wherein the stage is configured to send a status indicator different from the means for indicating to the means for transitioning to indicate whether new data will be processed by the stage in a next cycle, and whether data will be transferred in the next cycle between the stage and the adjacent stage.

55. The system of claim 54, wherein one of the plurality of stages is adjacent to the next stage and the previous stage in the asynchronous pipelined data path means.

56. The system of claim 55, wherein the means for transitioning associated with the stage is operative to transition between states without an indication of a state transition of a state machine means associated with the previous stage or the next stage.

57. The system of claim 55, further comprising:
means for receiving status signals from each of the plurality of stages; and
means for sending control signals to the means for controlling the transfer of data.

58. The system of claim 57, wherein the means for transitioning is operative to transition between states in response to the control signals and status signals from the stage.

59. The system of claim 57, wherein the means for transitioning is operative to perform the first state transition in response to an indication that the data in the means for storing data is invalid.

60. The system of claim 57, wherein the means for transitioning is operative to perform the first state transition in a clock cycle in response to the means for transitioning performing the second state transition in the clock cycle.

61. The system of claim 57, wherein the asynchronous pipelined data path means has an entrance adjacent a first stage and an exit adjacent a last stage.

62. The system of claim 61, wherein the means for transitioning is operative to perform the second state transition in response to the valid indicator indicating that the data in the means for storing data is invalid and receiving:
a control signal indicating that the last stage or any stage between the stage and the last stage contains invalid data; and
a control signal indicating that the stage or any stage between the first stage and the stage is done processing.

63. The system of claim 54, further comprising:
means for setting a value of the valid indicator to indicate valid data in response to loading data into the means for storing data in a clock cycle.

64. The system of claim 54, further comprising:
means for setting a value of the valid indicator to indicate invalid data in response to outputting data from the means for storing data and not loading data into the means for storing data in a clock cycle.

65. The apparatus of claim 1, wherein the status indicator is configured to indicate that the asynchronous pipelined data path means is ready for new data transfer before loading data from the previous stage into the data store and transferring data in the data store to a next stage.

* * * * *